United States Patent [19]

Weynant née Girones

[11] Patent Number: 5,335,994
[45] Date of Patent: Aug. 9, 1994

[54] TEMPERATURE MONITORING DEVICE CONTAINING AT LEAST ONE ELEMENT OF AN ALLOY WHICH MEMORIZES ITS SHAPE

[75] Inventor: Renée P. Weynant née Girones, Cadenet, France

[73] Assignee: G.I.R., Cadenet, France

[21] Appl. No.: 837,074

[22] Filed: Feb. 14, 1992

Related U.S. Application Data

[62] Division of Ser. No. 619,193, Nov. 27, 1990, Pat. No. 5,143,453, which is a division of Ser. No. 499,333, Jun. 1, 1990, Pat. No. 5,018,874.

[30] Foreign Application Priority Data

Oct. 4, 1988 [FR] France .................. 8813245

[51] Int. Cl.⁵ .................. G01K 3/00; G01K 1/02
[52] U.S. Cl. .................. 374/205; 374/106; 116/216; 116/221
[58] Field of Search .............. 60/527, 529; 116/216, 116/217, 220, 221, DIG. 10; 337/139, 140; 374/205, 206, 207, 104, 106; 426/88

[56] References Cited

U.S. PATENT DOCUMENTS

| | | | |
|---|---|---|---|
| 2,966,261 | 12/1960 | Bradbury | 116/221 |
| 3,214,278 | 10/1965 | Mylo | 374/206 |
| 3,290,942 | 12/1966 | Carbaugh et al. | 116/221 X |
| 3,998,098 | 12/1976 | Chilton | 374/106 |
| 4,448,147 | 5/1984 | Dewaegheneire | 116/216 |
| 4,634,021 | 1/1987 | Davis | 221/3 |
| 5,018,874 | 5/1991 | Weynant née Girones | 374/205 |
| 5,076,197 | 12/1991 | Darringer | 116/221 |
| 5,143,453 | 9/1992 | Weynant née Girones | 374/205 |

FOREIGN PATENT DOCUMENTS

| | | | |
|---|---|---|---|
| 122057 | 10/1984 | European Pat. Off. | 374/205 |
| 1392207 | 4/1975 | United Kingdom | 374/205 |

*Primary Examiner*—William A. Cuchlinski, Jr.
*Assistant Examiner*—G. Bradley Bennett
*Attorney, Agent, or Firm*—Herbert Dubno; Yuri Kateshov

[57] ABSTRACT

This device comprises a casing (2) of synthetic material containing a motor element (7) made of at least one alloy which memorizes its shape and having associated with it a movement transmission element consisting of a piston (9) and a rod (10) and acting on at least one indicator element (4) irreversibly recording each overstepping of a predetermined temperature, the casing being provided with transparent windows permitting the state of the indicator element or elements to be viewed.

Application to the monitoring of the overstepping of a temperature.

10 Claims, 13 Drawing Sheets

TEMPERATURE MONITORING DEVICE CONTAINING AT LEAST ONE ELEMENT OF AN ALLOY WHICH MEMORIZES ITS SHAPE

CROSS REFERENCE TO RELATED APPLICATIONS

This application is a division of Ser. No. 07/619,193 filed Nov. 27, 1990 (U.S. Pat. No. 5,143,453)as a division of Ser. No. 07/499,333 filed Jun. 1, 1990 (U.S. Pat. No. 5,018,874) as a national phase of PCT/FR89/00510 filed Oct. 3, 1989 and based, in turn, upon French national application 88 13245 of Oct. 4, 1988 under the International Convention.

FIELD OF THE INVENTION

The present invention relates to a temperature monitoring device containing at least one element of an alloy which memorizes its shape (i.e. a shape-memory element).

BACKGROUND OF THE INVENTION

In numerous fields it is necessary to record the temperature variations to which a product is subjected, in cases where, depending on circumstances, one or more variations or the overstepping of predetermined temperatures could make the product unsuitable for subsequent use.

One common example relates to the field of foodstuffs, where it is necessary to check continuously the quality of the refrigeration of perishable produce: fresh, deep-frozen and frozen products, or foods which must be kept at a certain temperature.

It is however not exceptional for such products, in the course of the various manipulations to which they are subjected, to exceed a predetermined temperature above which they may be damaged.

It is also important to check continuously the quality of the cold supplied by equipment producing or maintaining cold, such as refrigerators or freezers, since an operating fault may result in a rise in temperature injurious to the products contained in them.

It is also necessary to maintain a continuous quality check on sterilization processes, in respect of both the products sterilized and the sterilization equipment.

Where health is concerned, it is necessary to maintain a continuous check on the conditions of conservation of blood or products derived from blood, biological and biogenetic products or certain pharmaceutical products for which temperatures must be strictly respected.

In the medical field, it is also necessary to maintain a continuous check on transplant organs and animal and human gametes.

In the industrial field, it is also desirable to monitor the operating temperature of certain machine parts, the manufacturing temperature of certain components, particularly electronic components, and also the storage temperature of various materials, such as composite materials or photographic emulsions, for example.

In addition, in the industrial field, temperature variations are in certain cases accompanied by variations of pressure which it is necessary to check continuously. These include for example, variations in pressure pipes monitored with the aid of instrumented valves.

It is therefore important to have available a simple, reliable device capable of being attached to the product and/or machines and of indicating by direct reading the overstepping of a determined temperature.

French Patent No. 2 560 992 in the name of the Applicant relates to a device in which the overstepping of a determined temperature is indicated by an irreversible coloration triggered with the aid of an element made of an alloy which memorizes its shape.

OBJECTS OF THE INVENTION

An object of the present invention is therefore to provide a device, made of an alloy which memorizes its shape, which enables temperatures to be monitored. Other objections relate to a device which is capable of detecting a plurality of oversteppings of the temperature, while storing the number of oversteppings;

is capable of having a variable response time ("delay time") on each of the temperature thresholds, which is at present not the case for all devices, including that of French Patent No. 2 560 992;

includes a tamperproof system for the display of each of the temperature thresholds;

operates in all positions;

is resistant to shocks, vibrations, radiation and corrosion;

can be produced and stored at ambient temperature whatever the utilization temperatures; and is self-activating on passing through the different temperature thresholds.

To this end, the device to which the invention relates comprises a casing of synthetic material containing a motor element made of at least one alloy which memorizes its shape and having associated with it a movement transmission element consisting of a piston and a rod and acting on at least one indicator element irreversibly recording the overstepping of a predetermined temperature, said casing being provided with transparent windows enabling the state of the indicator element or elements to be viewed.

The motor element makes use of a material of an alloy of known type, which memorizes its shape, for example of the copper-nickel-aluminum, copper-zinc-aluminum or titanium-nickel type, or else it may be made of other ternary or quaternary alloys.

BRIEF DESCRIPTION OF THE DRAWING

The invention will be described in greater detail with reference to the accompanying schematic drawings showing, as nonlimitative examples, a number of embodiments of this device, which is intended for monitoring the crossing of temperature thresholds. In the drawing

SPECIFIC DESCRIPTION

Figure 1:
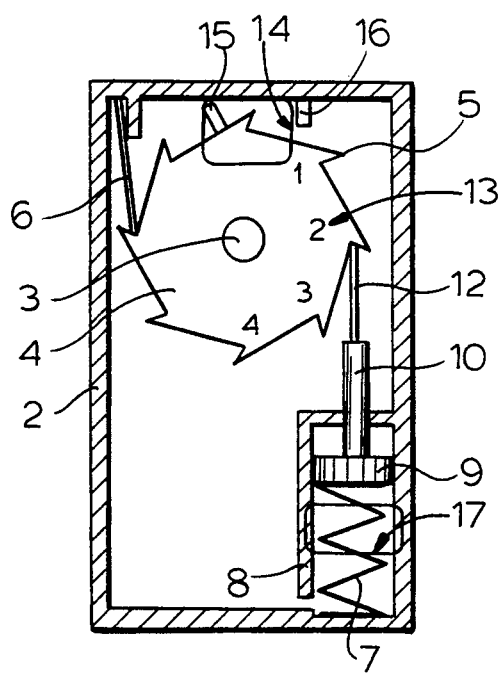
FIGS. 1 to 3 are three views in longitudinal section of a first device in the course of three operating phases.
Figure 2:
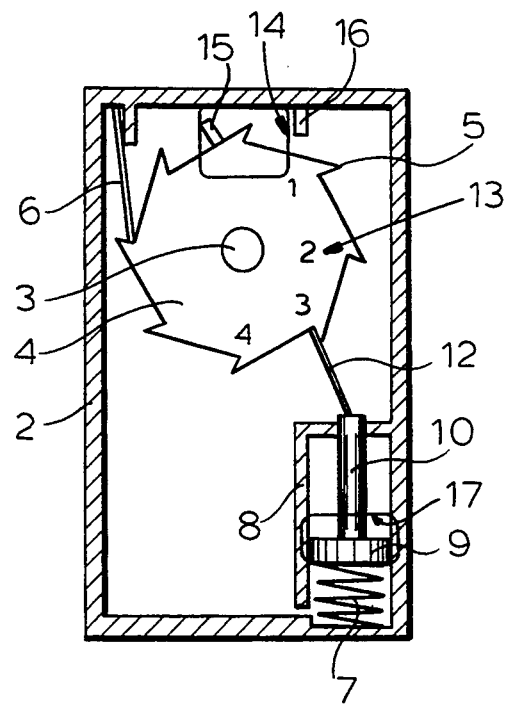
Figure 3:
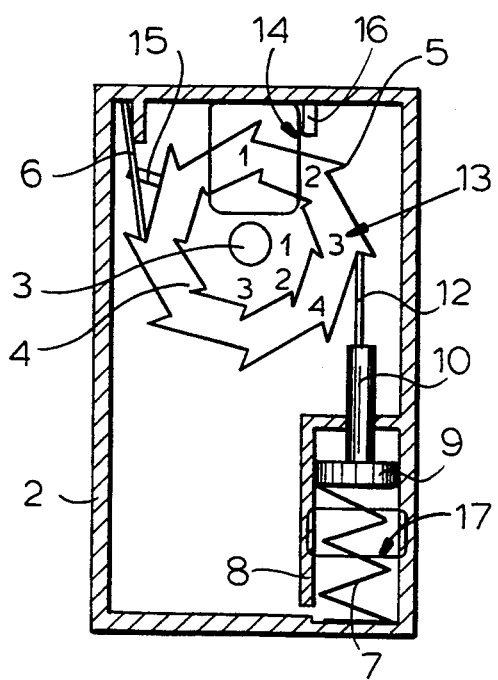

The device shown in FIGS. 1 to 3 comprises a casing 2 of parallelepipedic general shape, in which a wheel 4, on the periphery of which teeth 5 are regularly spaced, is mounted for rotating about an axis 3.

As can be seen from the drawing, the teeth 5 are directed towards the real in relation to the direction of rotation of the wheel. The wheel can turn in one direction only since a resilient tongue 6 forming a nonreturn pawl is supported in each stable angular position of the wheel in the bottom of the cavity formed at the rear of a tooth 5, thus preventing the rotation of the wheel in the clockwise direction.

A spring 7 of an alloy which memorizes its shape (i.e. shape-memory alloy, is mounted in a cylinder 8 whose axis is substantially tangential to the circumference of the wheel, one end of said spring being fixed against the bottom of the casing while its other end is fixed on a piston 9 mounted for sliding in the cylinder 8, from the other face of which piston a rod 10 projects, the free end of which is equipped with a metal blade 12 prestressed in the direction of the wheel axis 3 and intended to come to be supported in the cavity disposed at the rear of a tooth 5 on the wheel 4.

As shown in FIGS. 1 to 3, the wheel 4 is provided, facing each tooth 5, with a mark 13, which in the present case is in the form of a numeral. Each mark 13 is visible through a transparent window 14 when it is situated facing the window. Finally, the wheel 4 has a finger 15 projecting laterally and intended to come to bear against a stop 16 fastened to the casing when the wheel has pivoted less than one turn, in order to prevent the same marks 13 from coming in succession more than once to face the window 14. It should be noted that the distance between two adjacent teeth 5 on the wheel corresponds to the stroke of the spring 7 in the course of a deformation of the latter.

The device functions is as follows:

At ambient temperature the spring 7 is elongated as shown in FIG. 1, the piston 9 being situated in the top position and the metal blade 12 being inserted into the cavity situated at the rear of the tooth bearing the reference (2). The window 14, and also a window 17 situated on the path of travel of the spring, allow no particular distinctive sign to be seen.

When the temperature of the casing has been lowered to the storage temperature of the product to be monitored, the spring 7 contracts until its turns are substantially contiguous, carrying with it in its stroke the piston 9, which takes up position facing the window 17, and the metal blade 12, the end of which comes to lie in the cavity situated to the rear of the tooth bearing the reference (3).

The fact that the user can view the piston 9 through the window makes it possible to know that the product and the device associated with it are actually at the selected preservation temperature.

If the temperature rises above a predetermined threshold, the spring 7 resumes its elongated configuration, as shown in FIG. 3, the metal blade 12, in the course of the relaxation of the spring, driving the wheel 4 to rotate in the counterclockwise direction, the end of the rotation being such that the window 14 makes it possible to view the tooth bearing the reference (1). At the same time the piston 9 disappears from the window 17, which indicates that the normal storage temperature has been overstepped and that this rise in temperature is still continuing, because the piston is not visible in the window 17.

When the temperature falls again, the spring contracts and the piston 9 is once again visible through the window, indicating that the storage temperature has been reached again, although the information supplied in the window 14 indicates that the product has overstepped the normal temperature threshold. It is thus possible to see immediately the number of oversteppings of the temperature, this number being able to be at most equal to the number of teeth on the wheel, since the latter is necessarily prevented from rotating when the finger 15 bears against the stop 16; a plurality of successive rotations of the wheel cannot in fact make it possible to record an exact number of oversteppings of the temperature.

It is possible to use in association a plurality of wheels of different diameters (see FIG. 3), which are operated in succession when the wheel of larger size has made one turn; a larger number of oversteppings of the temperature can thus be detected.

Figure 4:
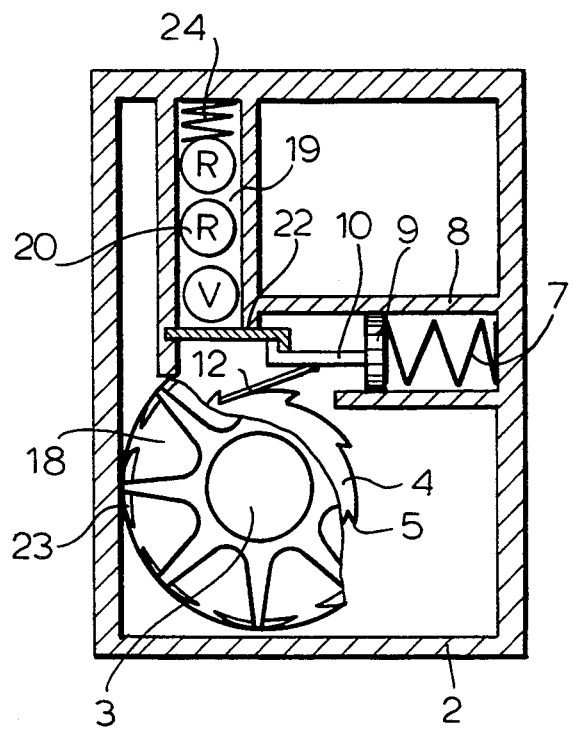
FIGS. 4 to 6 are three views in longitudinal section of a second device in the course of three operating phases.
Figure 5:
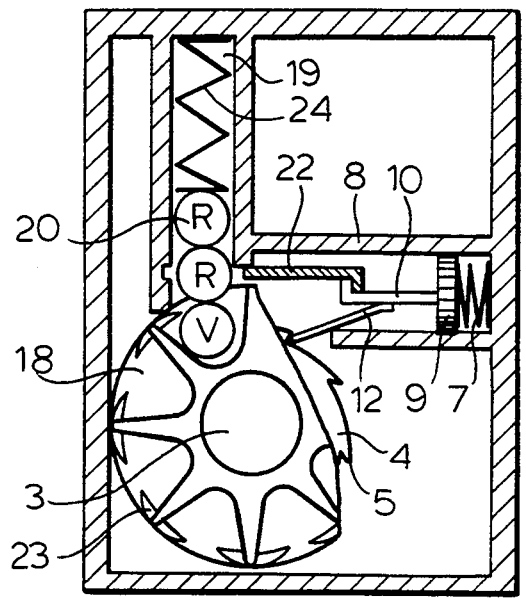
Figure 6:
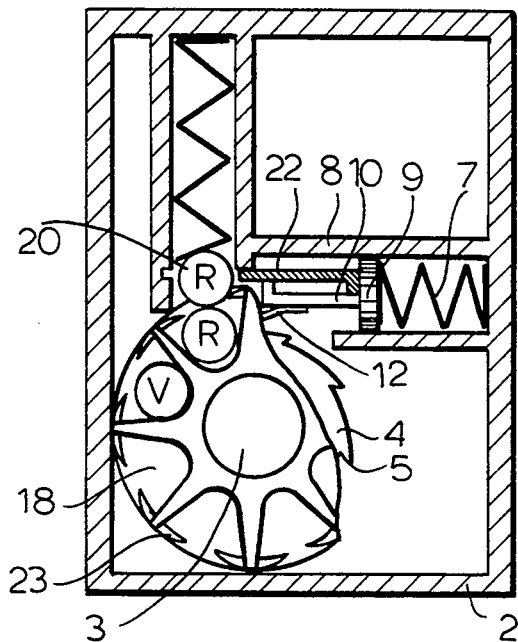

FIGS. 4 to 6 show a device similar to the preceding device, that is to say one having a notched wheel, the same elements therein being given the same references numerals as previously.

In this device the toothed wheel 4 is equipped, in a plane parallel to that containing the teeth, with an equal number of buckets 18 arranged in the same angular distribution and leading out to the outside. A magazine 19 containing balls 20 is mounted adjacent to the cylinder 8 containing the spring 7 of an alloy which memorizes its shape, the respective axes of the cylinder 8 and magazine 20 being at right angles to one another. The opening of the magazine 19 can be closed by a slide 22 adapted to be moved by the rod 10 associated with the piston 9. The size of the buckets 18 is such that each of them can receive a ball 20, each ball being retained in the bucket receiving it by means of resilient tongues 23 disposed at the edge of the bucket.

This device functions in the following manner:

At ambient temperature, and as shown in FIG. 4, the balls 20 are locked in the magazine 19 by the slide 22. When the temperature falls to the storage value, the spring 7 is compressed, carrying with it in its stroke the rod 10 and the slide 22, which opens the magazine 19. The first ball, which may for example be a ball which is green in color, is pushed by the following balls, which are subjected to the action of a spring 24, into the first bucket 18. If the temperature rises above a predetermined threshold, the spring resumes its elongated shape and rotates the wheel 4 with the aid of the rod 10 and the metal blade 12, the slide 22 not being moved.

In the course of this rotation, a new bucket 18 comes to face the magazine 19, enabling a ball 20, which may be a red ball indicating overstepping of the threshold temperature to be received. A further lowering of the temperature enables the spring to be recompressed. The transparency of the top part of the casing, or at least of the zone of it which is facing the path of travel of the bucket, makes it possible to view immediately the number of oversteppings of the threshold temperature.

Figure 7:
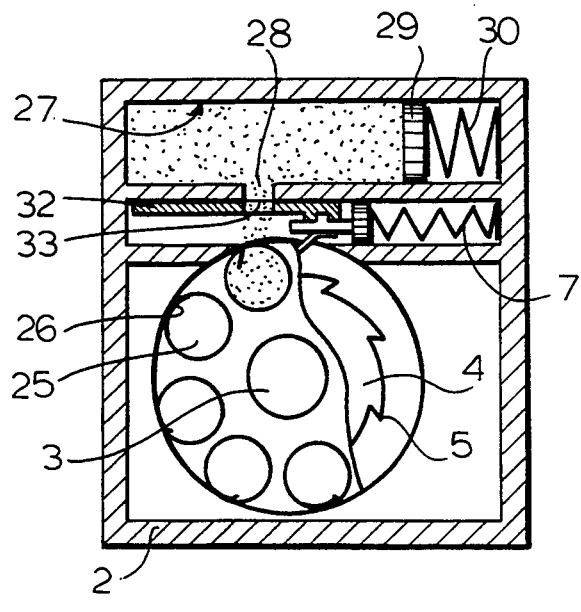
FIGS. 7 to 9 are three sectional views of a third pivoting device in the course of three operating phases.
Figure 8:
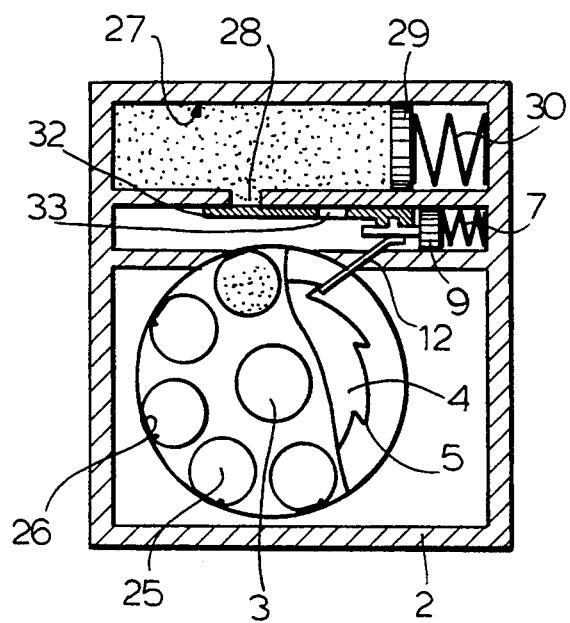
Figure 9:
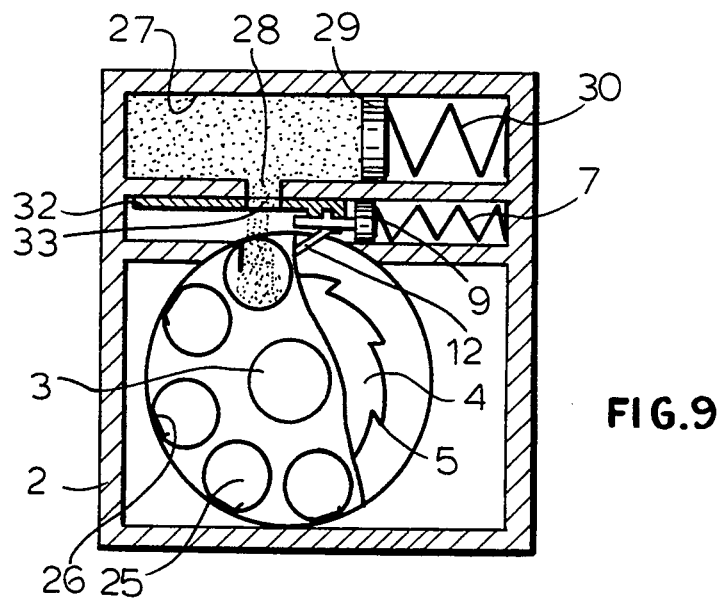

FIGS. 7 to 9 illustrate another device similar to the preceding devices, that is to say provided with a notched wheel adapted to be driven rotationally every time the temperature is overstepped, wherein the same elements are given the same references as previously. In this case the notched wheel is associated with buckets 25, each of which is situated facing a tooth 5 on the wheel, each of these buckets having a closure flap 26.

In this embodiment a reservoir 27 containing a fluent medium, such as powder, sand or a viscous liquid, is mounted adjacent to the cylinder 8 containing the spring 7. The fluid is able to flow out of the reservoir by way of an opening 28 through the action of the pressure exerted by a piston 29 and a spring 30. A slide 32, which also has an opening 33, is fastened to the rod 10, the opening 33 being so positioned that it is situated opposite the opening 32 of the reservoir when the spring 7 is in the relaxed position.

At ambient temperature, illustrated in FIG. 7, as the openings 32 and 33 lie opposite one another the first bucket 25 is filled with fluid. When the temperature of the device is lowered below a predetermined value, the spring 7 is compressed and the slide 32 then closes the reservoir 27, as shown in FIG. 8. When the threshold temperature is overstepped, the spring 7 is relaxed, thereby bringing about on the one hand the rotation of the wheel 4 and the bringing of another bucket to face the opening 32 of the reservoir, and on the other hand the establishment of communication between said opening 32 and the opening 33 in the slide. This bucket is filled until the temperature falls again, the amount of the flowable medium contained in the bucket making it possible not only to determine that the temperature had been overstepped, but also to estimate the duration of this overstepping, if the rate of flow of fluid out of the reservoir is known.

It is possible to provide a more elaborate apparatus comprising a second motor, of an alloy which memorizes its shape, to close the slide or the flaps as soon as the threshold temperature is passed in the opposite direction, in such a Banner as to indicate the threshold overstepping time.

Figure 10:
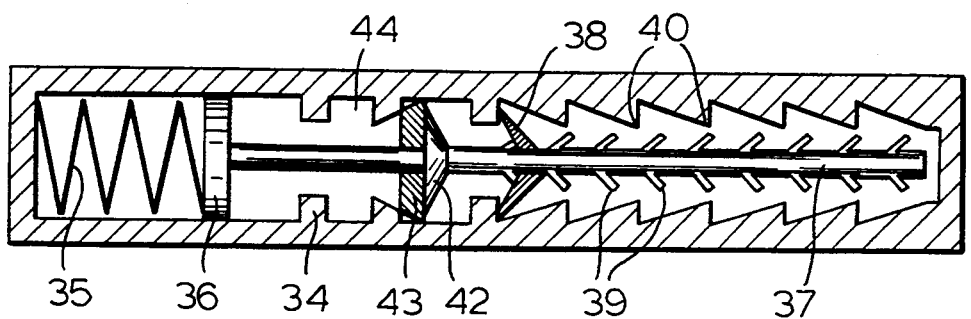
FIGS. 10 to 12 are three views in longitudinal section of a first linear displacement device in the course of three operating phases.
Figure 11:
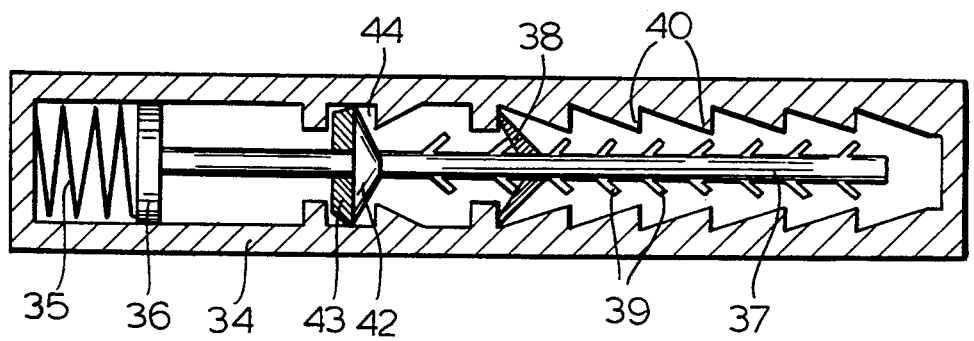
Figure 12:
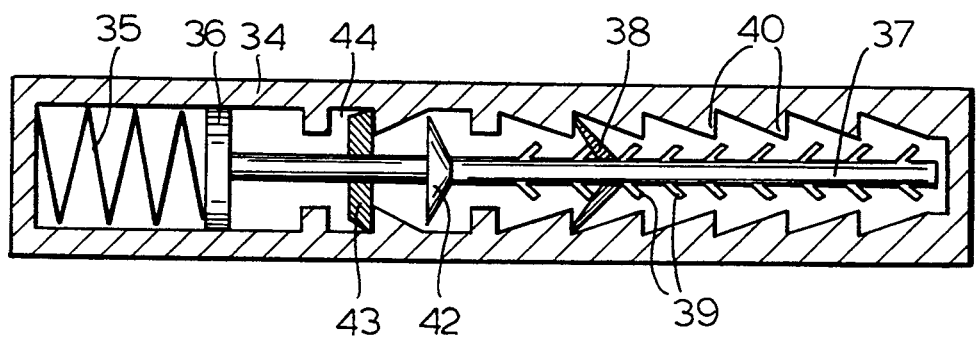

The device illustrated in FIGS. 10 to 12 is a linearly functioning device comprising an elongate body 34, for example of cylindrical shape. At one end of the casing 34 is mounted, inside the latter, a spring 35 of a shape memory alloy which memorizes its shape, one end of which is fixed against the bottom of the casing, while its other end is fixed on a piston 36 fastened to a rod 37 extending in the lengthwise direction of the casing. On this rod 37 is mounted a cursor 38 provided with a central opening and having a profiled body, that is to say having a side wall diverging from the rod towards the outside and from the opposite end of the casing to that which is equipped with the spring towards the end equipped with the spring. The rod is equipped with cogs 39 profiled oppositely to the cursor, in order to permit displacement of the rod, in relation to the cursor, only in the direction of the spring 35. The casing is in turn provided on its inside face with cogs 40 which consist of a succession of inclined surfaces and surfaces at right angles to the rod 37, permitting the displacement of the cursor only from the end of the casing provided with the spring towards its opposite end. The rod 37 also carries, near the piston 36, a shoulder 42 intended to cooperate with a ring 43 mounted loose on the rod between the piston 36 and said shoulder. Close to its end situated near the piston 36 the casing 34 is provided with a recess 44 disposed facing a window (not shown in the drawing). It is to be noted that the stroke of the spring 35 in the course of a cycle of deformation corresponds substantially to the pitch of the cogs 40 on the casing.

The functioning of this device is as follows:

At ambient temperature, and before its first use, the device is in the state illustrated in FIG. 10. When the temperature is lowered to the storage value, the spring 35 is compressed, carrying with it in its stroke the piston 36, the rod 37 and the shoulder 42. The latter causes the ring 43 to pass into the recess 44, thus making it possible to view instantaneously the fall to storage temperature. It is to be noted that in the course of this stroke, and as illustrated in FIG. 11, the cursor 38 has not moved because It has remained locked by the cog 40, against which it was bearing, while permitting the passage through its central opening of a nonreturn cog 39 on the rod 37.

If the temperature rises above the threshold value, the spring 35 is relaxed, thus bringing about the movement of the piston 36 and rod 37 to the right. A cog 39 bearing against the cursor 38 moves the latter towards the right in order to bring it into a locked position in the next nonreturn cog 40. It is thus possible to view immediately the number of oversteppings of the threshold temperature, by counting the number of cogs 40 over which the cursor 38 has traveled. This is made possible by the provision of a window in the body of the casing, on the path of travel of the cursor 38, and the Barking of graduations along this window.

Figure 13:
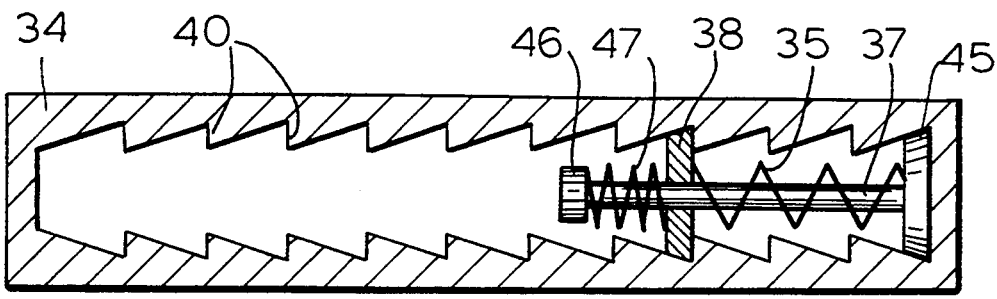
FIGS. 13 to 15 are three views in longitudinal section of a second linear displacement device in the course of three operating phases.
Figure 14:
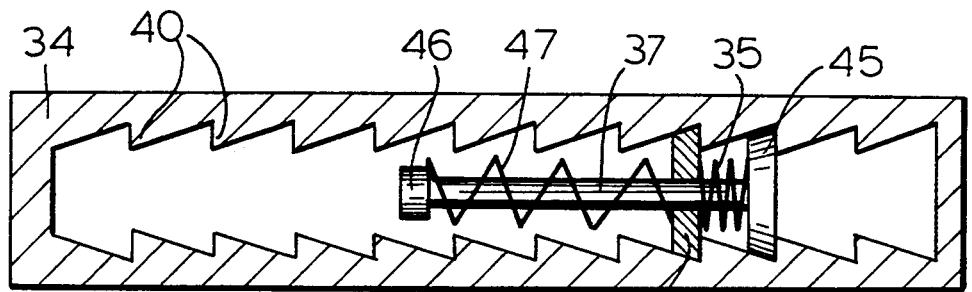
Figure 15:
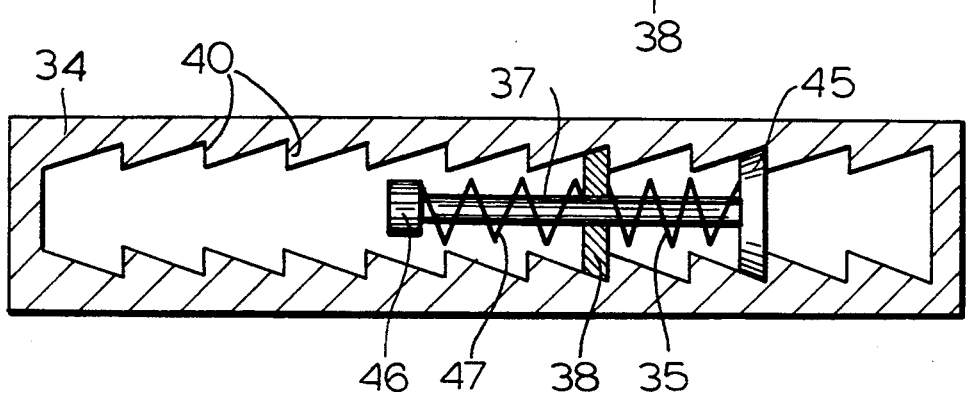

FIGS. 13 to 15 illustrate a constructional variant of the device in FIGS. 10 to 12, the same elements being given therein the same references as previously.

In this case the spring 35, made of an alloy which memorizes its shape, is fixed, not against the bottom of the casing, but against the bottom of a second cursor 45 fulfilling the function of the piston 36 previously described, the spring 35 bearing directly against the cursor 38. The rod 37 fastened to the cursor 45 passes through said cursor 38 and its free end carries a shoulder 46 serving as support for a balancing spring 47, the other end of which bears against the cursor 38. When the device is at ambient temperature, as shown in FIG. 13, the spring 35 is relaxed and the two cursors 38 and 45 are separated by three cogs 40 on the casing 34. When the temperature of the device falls and when the storage temperature is reached, the spring is compressed. With the cursor 38 locked against a cog 40, the cursor 45 accompanies the spring in its movement, so that at the end of the compression the two cursors are situated against neighboring cogs, as shown in FIG. 14. A window, not shown in the drawing, makes it possible to view the position of the two cursors. If when the temperature rises the threshold temperature is reached and then overstepped, the spring 35 is lengthened, and since the cursor 45 is locked against the cog 40 with which it is in contact, only the cursor 38 can accompany the movement of the spring and be displaced by one cog. If the temperature continues to rise, the cursor 38 can continue to be displaced because of the corresponding elongation of the spring 35.

The presence of the balancing spring 47 makes it possible to avoid fastening together the end of the spring 35 and the cursor 38 and to compensate for hysteresis phenomena connected with the functioning of a spring of an alloy which memorizes its shape.

If the spring 35 is fixed at both ends, on the cursor 38 and on the cursor 45 respectively, and if there are no hysteresis phenomena, It is possible to dispense with the balancing spring 47.

Figure 16:
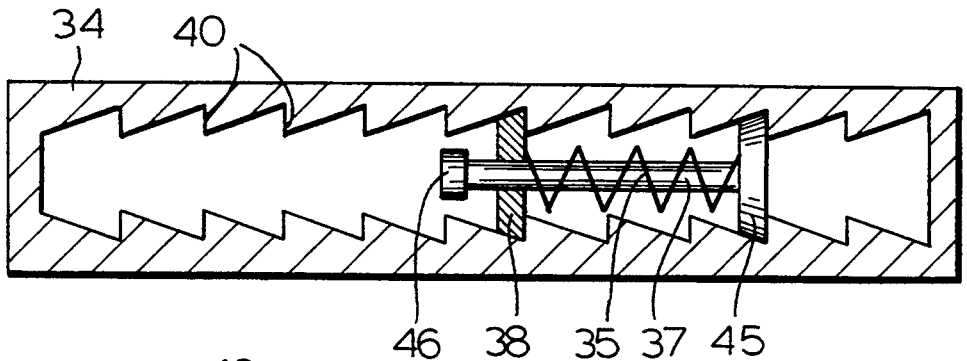
FIGS. 16 and 17 are two views in longitudinal section of a variant of the device shown in FIGS. 13 to 15.
Figure 17:
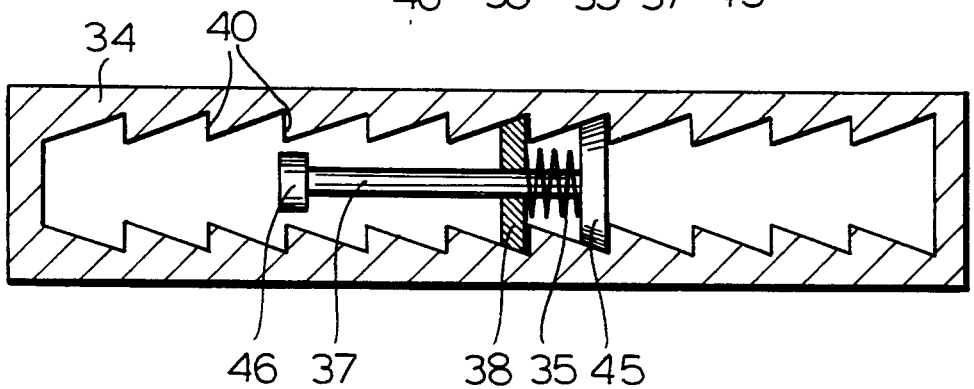

The device is then in the simplified form shown in FIGS. 16 and 17, which respectively show the spring in the relaxed position and in the compressed position.

Figure 18:
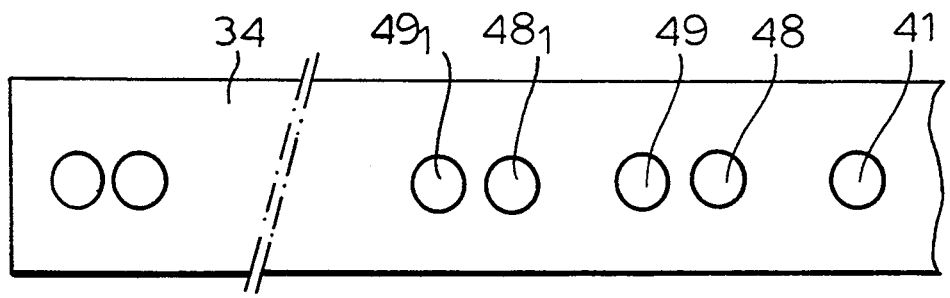
FIG. 18 is a view of the outside of the casing of a device corresponding to one of the embodiments of FIGS. 13 to 17.

FIG. 18 illustrates very schematically the outside of a casing, and more particularly the series of windows provided in the latter. These windows 48 and 49, are grouped in pairs, with the exception of the window 41 on the extreme right at which the cursor 45 is situated and which corresponds to the normal manufacturing temperature (ambient temperature). At the manufacturing temperature the cursor 45 is in the window 41, while the cursor 38 is in the window 49. At normal storage temperature ( low temperature ) the cursor 45 has passed into the window 48, while the cursor 38 has passed into the window 49. After the temperature has for the first time overstepped the storage temperature, the cursor 45 has passed into the window 48, while the cursor 38 has remained in the window $49_1$. When the low storage temperature is reached once again, the cursor 45 passes into the window $48_1$.

The indices$_i$ of the windows $48_i$ and $49_i$ thus indicate the number of oversteppings of the storage temperature and, depending on the position of the cursor 45, the return or failure to return to the storage temperature after the overstepping.

Depending on the thickness of the casing 34, there will be a longer or shorter delay time on the overstepping of temperatures, varying from a few minutes to several hours according to the desires of the user when the device is manufactured.

It is possible to modify the casing in respect of the position of the windows $49_i$ relative to $48_i$ and to follow the pair 45–46 ( instead of 45–38 ) in its respective movements.

It is interesting to provide cursors of different colors: 45 being green and that or those designated 38 (and 46) being red, for example. The user will thus be able to deduce immediately the number of oversteppings of the normal storage temperature.

Figure 19:
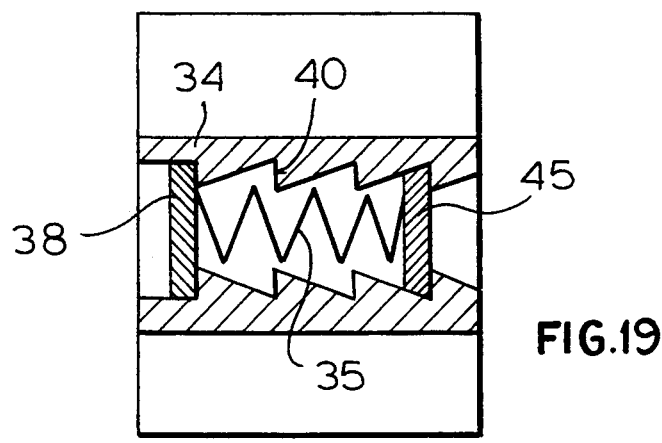
FIG. 19 shows a second constructional variant of the device of FIGS. 13 to 15.
Figure 20:
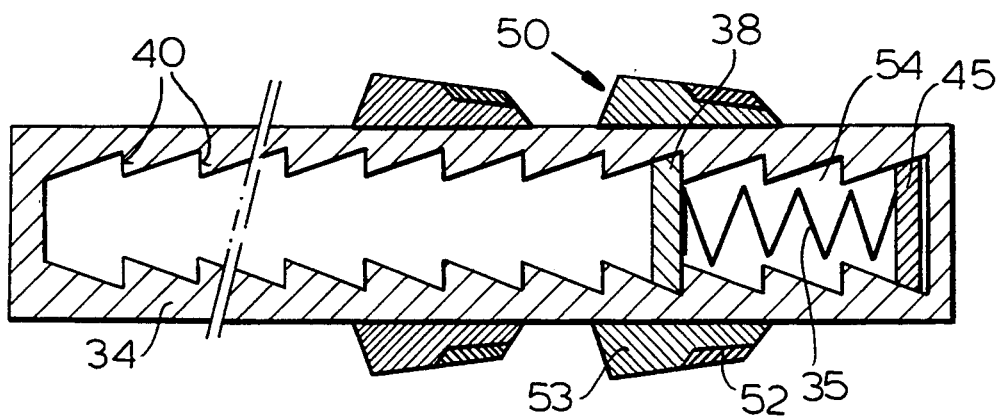
FIGS. 20 to 23 show a constructional variant of the device of FIG. 19, with the introduction of elements increasing thermal inertia.

FIG. 19 illustrates a constructional variant of the preceding devices, wherein the two cursors 38 and 45 are no longer connected to one another by a rod sliding through the cursor 38, but only by the spring 35 of an alloy which memorizes its shape. It is to be noted that the cursor 38 may itself be of an alloy which memorizes its shape, in order to intervene in respect of the conditions under which it is moved and locked in the cogs 40 in dependence on the storage and threshold temperatures.

FIGS. 20 to 23 illustrate a variant of the device shown in FIGS. 16, 17 and 19, wherein means are provided which enable the deformation of the element 35 of an alloy which memorizes its shape to be delayed on the overstepping of a threshold temperature. For this purpose, the casing is provided on its periphery with a certain number of elements 50 offset axially relative to each other, each of them extending over a length corresponding to three cogs, while their upstream portion 52 (referring to the direction of movement of the spring 35) is smaller than the thickness of the downstream portion 53.

Figure 21:
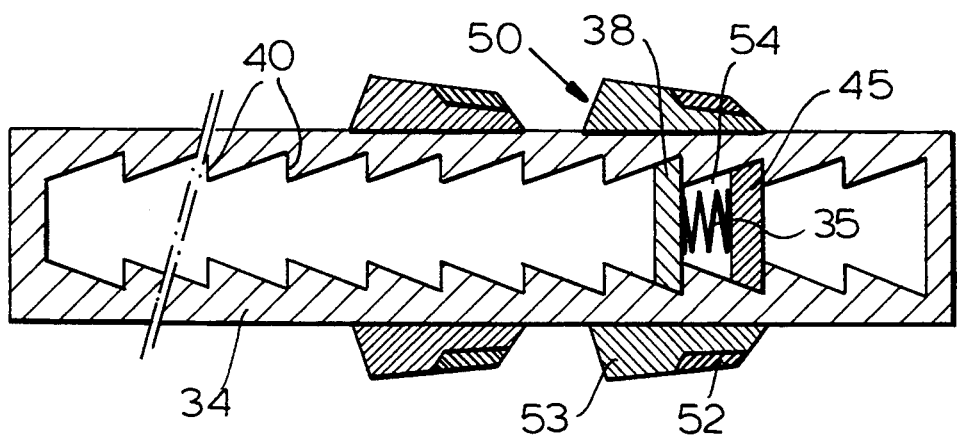
Figure 22:
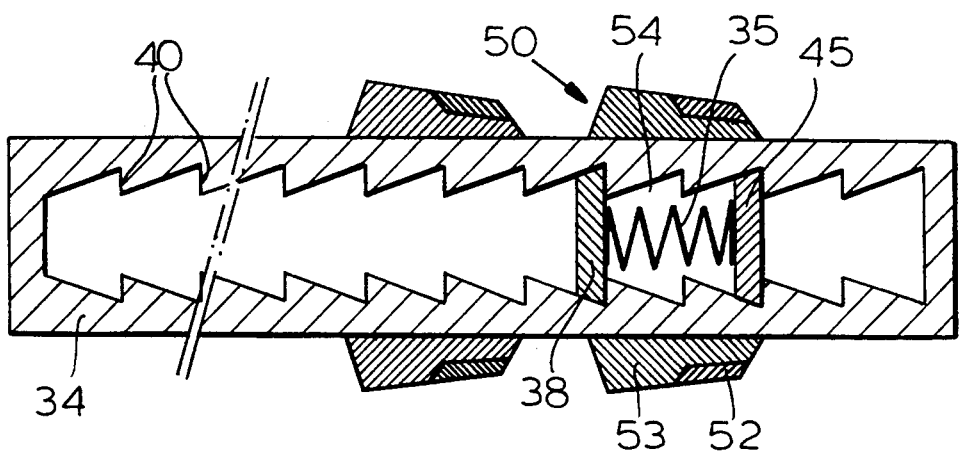
Figure 23:
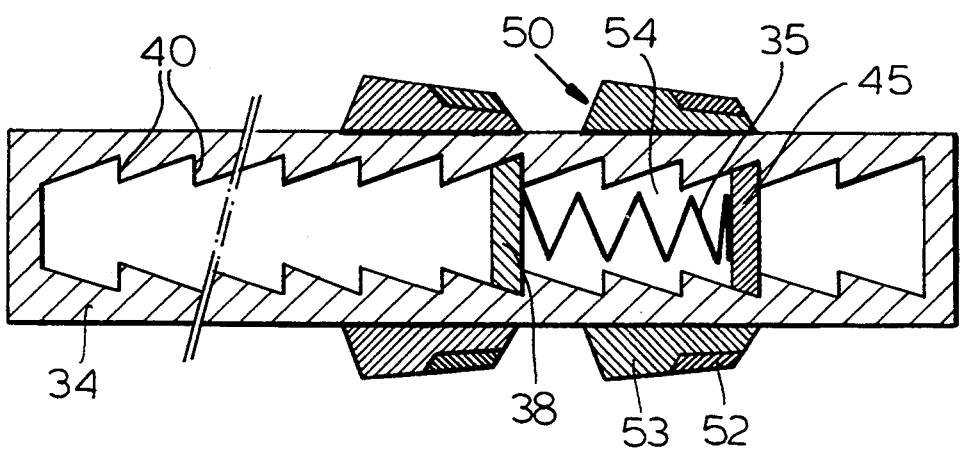

At ambient temperature the spring 35 is in its elongated position and the two cursors 38 and 45 are separated by three cogs. In conjunction with the body of the casing they delimit a chamber 54. The slight thickness of the body of the casing permits rapid thermal diffusion, so that, when the temperature falls to the set point, the spring 35 contracts very rapidly until the cursor 45 comes to bear against a cog adjacent to that against which the cursor 38 is bearing. In this position the volume delimited between the two cursors is situated, as shown in FIG. 21, facing the portion 52 of slight thickness of the first element 50. When the temperature oversteps the threshold temperature, the element 50, because of its thermal inertia, retards the response time of the spring. When the spring is relaxed, the cursor 38 moves at the same time as the spring, as shown in Figures 22 and 23.

By making use of the thickness of material of the elements 50 it is possible to adjust the response time of the spring 35, and optionally to have available a plurality of elements of different thicknesses in order to introduce specific inertias for the different oversteppings.

Figure 24:
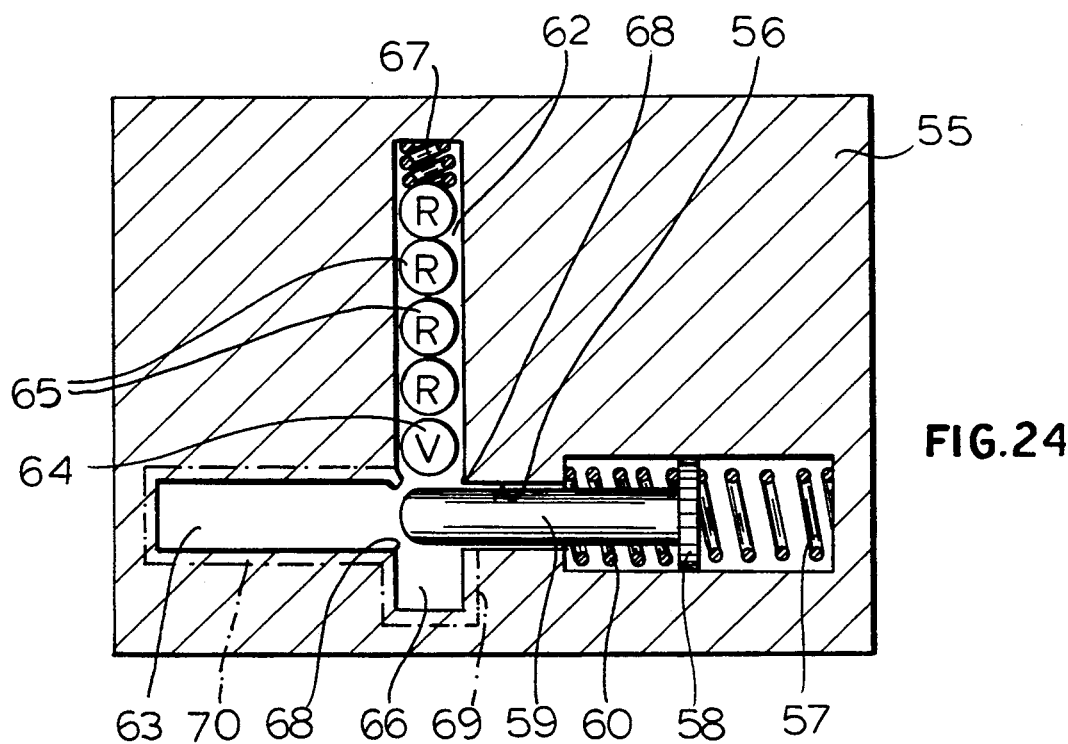
FIGS. 24 to 26 are three views in section of another device.
Figure 25:
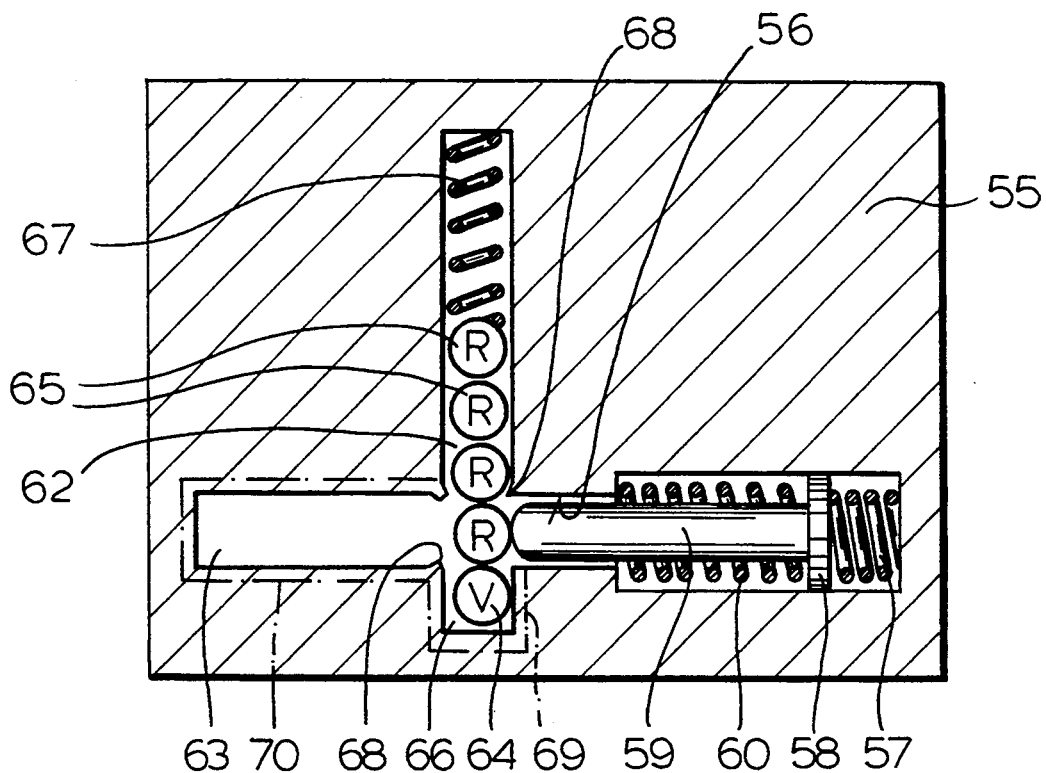
Figure 26:
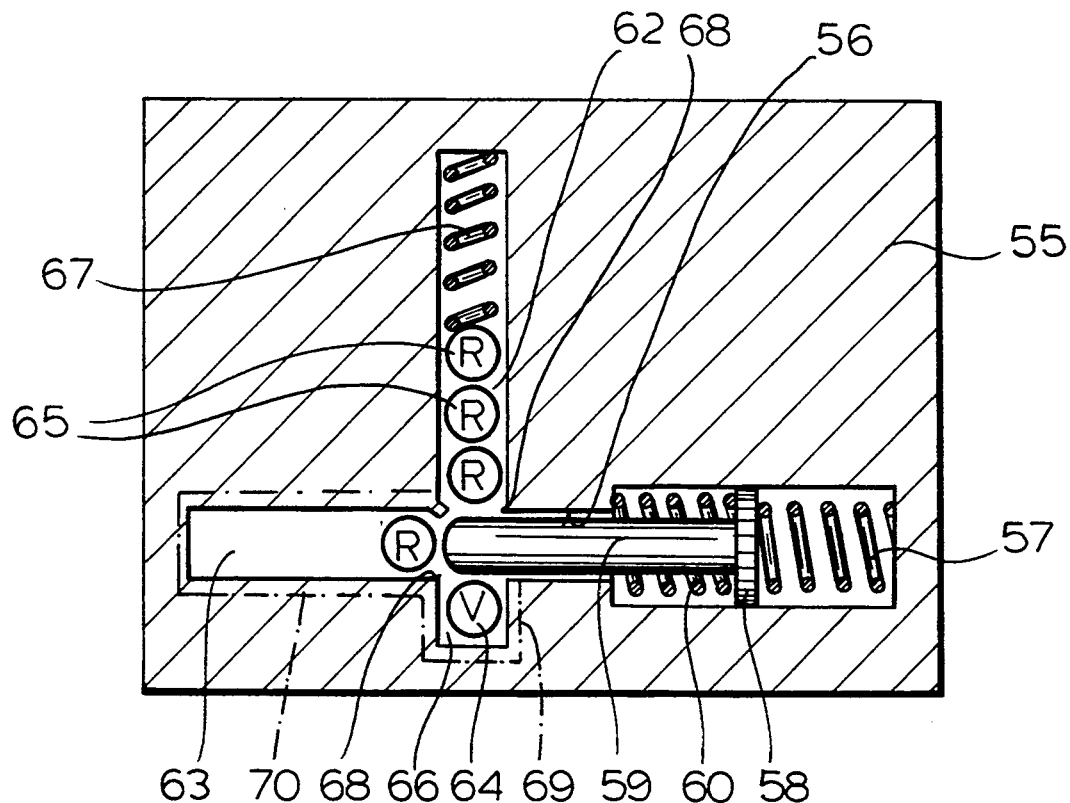
Figure 27:
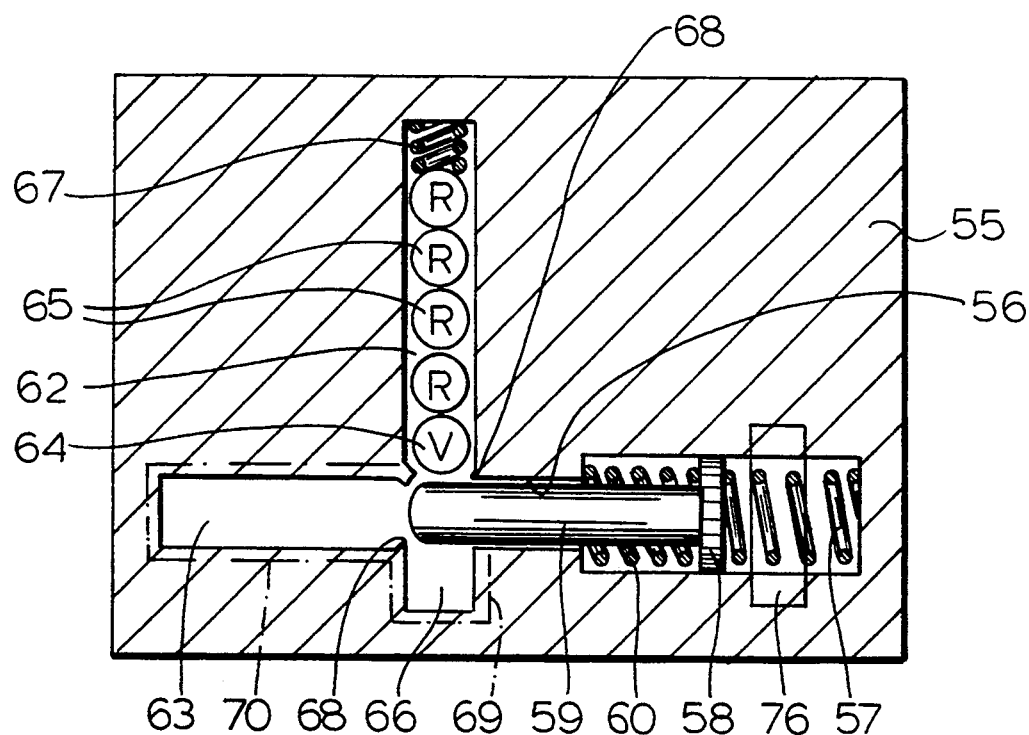
FIGS. 27 to 30 are four views in section of a first variant of the device shown in FIGS. 24 to 26.

FIGS. 24 to 26 illustrate another device comprising a casing 55 of parallelepipedic general shape, in which are provided two elongate chambers disposed at right angles to one another and leading one into the other. The first chamber 56 contains at one end a spring 57 of an alloy which memorizes its shape and being fastened at one end to the bottom of the chamber, while one end bears against a piston 58 fastened to a rod 59. A balancing spring 60, the presence of which is optional, bears against the piston 58. The chamber 56 extends on the other side of its zone of connection to the chamber 62, which is at right angles to it, in order to form a ball reception zone 63. The main part of the chamber 62 forms in fact a reservoir for a plurality of balls, which are five in number in the embodiment illustrated in the drawing, the first ball 64 being green in color and the others 65 being red in color.

In its zone situated beyond the chamber 56 this chamber 62 delimits a compartment 66 enabling only a single ball to be received. The length of the rod 59 is such that, depending on the state of the spring 57, it closes or opens the chamber 62.

At ambient temperature the device is in the state shown in FIG. 24, with the five balls housed in the chamber 62 and the latter closed by the rod 59. When the temperature falls to the set temperature, the spring 57 contracts, enabling the piston to move back and open the chamber 62, thus through the action of the relaxing of the spring 67 housed in the latter enabling the balls to advance, the green ball falling into the compartment 66 and the first red ball arriving facing the piston 59.

It is to be noted that tongues 68 provided in the crossing zones of the chambers 56 and 62 prevent disordered movements of the balls at undesired temperatures.

In the normal storage position the device is in the position shown in FIG. 25, with the green ball 64 visible through a window 69, thus indicating that the storage temperature has been duly reached. When the temperature rises above the set temperature, the spring is relaxed and moves the piston forwards, this movement causing the first red ball 65 to pass into the compartment 63, where this ball can be viewed through a window 70. In the course of each following cycle of fall and rise of the temperature a red ball is brought into the compartment 63, thus allowing the user to view directly the number of oversteppings of the temperate.

FIGS. 27 to 30 illustrate a first variant of the device described with reference to FIGS. 24 to 26, wherein the same elements are given the same references as previously.

This device has an additional original feature because of the presence of a window 76. Its functioning is identical with the exception that an additional indication is obtained with the aid of this window 76. At ambient temperature the device is in the state shown in FIG. 27, with the five balls housed in the chamber 62 and the latter closed by the rod 59. Only the spring 57 is visible through the window 76. When the set temperature falls, the spring contracts, enabling the piston to move back and open the chamber 62, thus through the action of the relaxing of the spring 67 housed in the latter enabling the balls to advance, the green ball falling into the compartment 66 and the first red bell arriving facing the piston 59.

It is to be noted that tongues 68 provided in the crossing zones of the chambers 56 and 62 prevent disordered movements of the balls at undesired temperatures.

Figure 28:
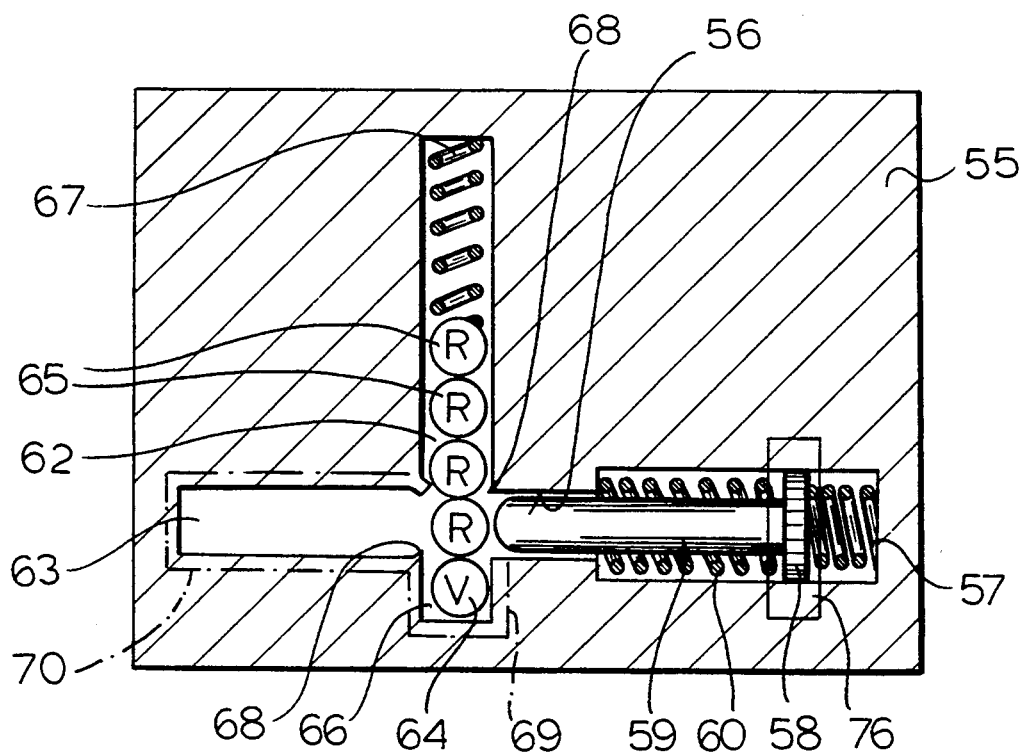

In the normal storage position the device is in the position shown in FIG. 28, the green ball 64 being visible through a window 69 and the support of the piston 58 likewise being visible through the window 76. These two indications show that the storage temperature has duly been reached on the first lowering of the temperature.

When the temperate rises above the set temperature, the spring of an alloy which memorizes its shape is relaxed and moves the piston forwards, this movement causing the first red ball 65 to pass into the compartment 63, where this ball can be viewed through a window 70.

Figure 29:
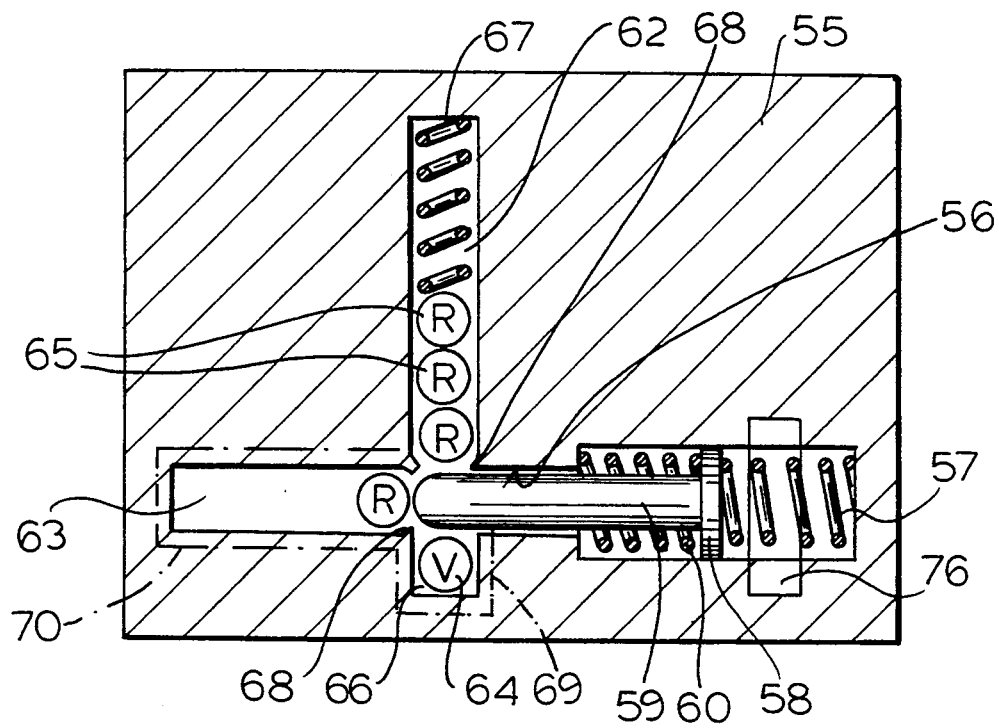

The support of the piston 58, however, is no longer visible in the new window 76, as shown in FIG. 29. Nevertheless, it may be that the rise in temperature is not sufficient to pass the predetermined critical threshold, so that the red ball will not be ejected because the memory spring is not sufficiently relaxed. This possibility will be indicated by the device, because the support of the piston 58 will no longer be visible in the window 76.

In the course of each following cycle of fall and rise of temperature a red ball is brought into the compartment 63, thus enabling the user to view directly the number of oversteppings of the temperature.

Figure 30:
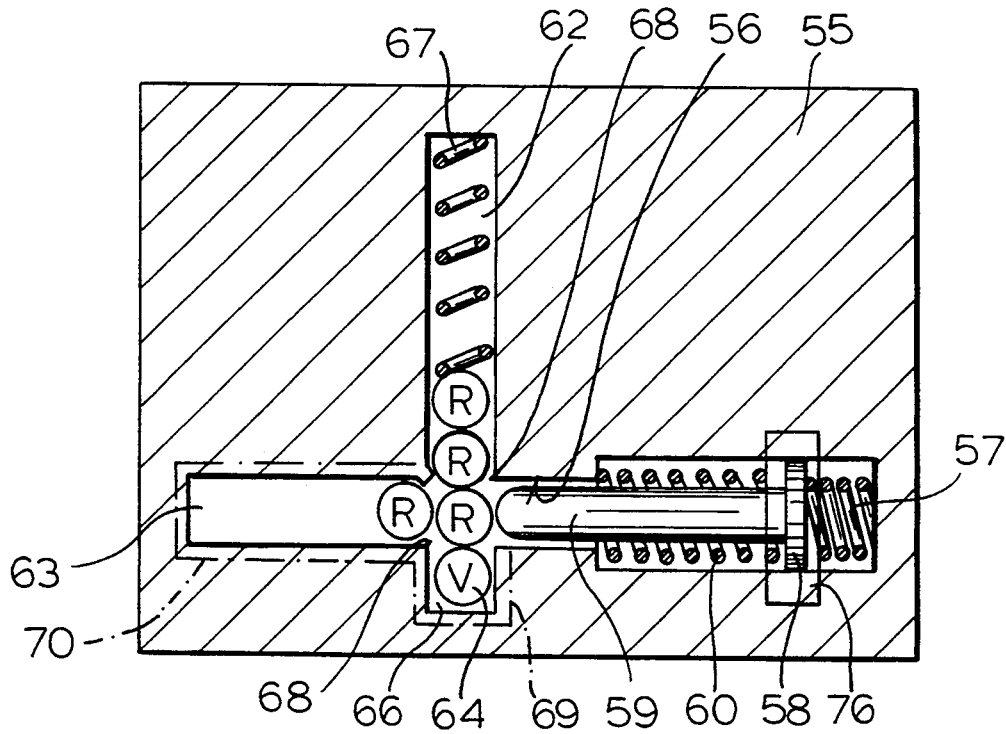
Figure 31:
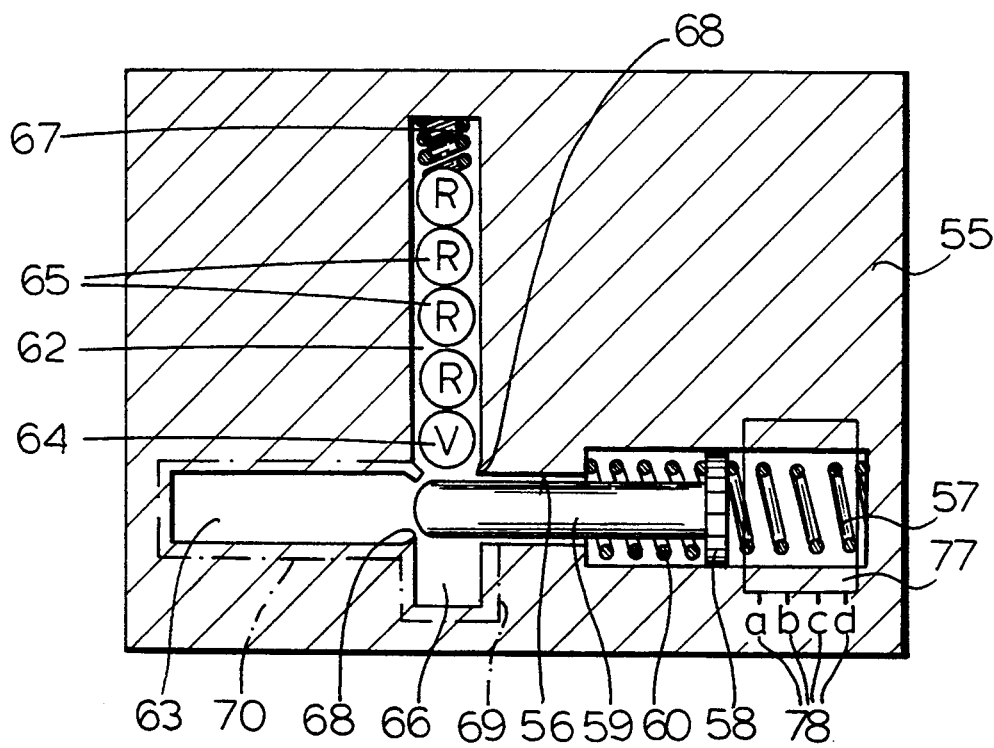
FIGS. 31 to 34 are four views in section of a second variant of the device shown in FIGS. 24 to 26.

FIG. 30 shows the first fall in temperature following an inopportune rise in temperature described in connection with FIG. 29. When the storage temperature has been reached again, the support of the piston 58 is again visible in the new window 76. If it is not visible and the device is in the configuration shown in FIG. 30 (one red ball ejected), this means that the temperature is higher than the storage temperature.

FIGS. 31 to 34 illustrate a second variant of the device previously described with reference to FIGS. 24 to 26. Compared with that device it has an original feature because of the presence of a large window 77 disposed in the zone of deflection of the spring 57 of an alloy which memorizes its shape, this window being provided with a linear graduation 78 (a, b, c, d); the functioning is the same as that of the preceding device, with additional indications. At ambient temperature (FIG. 31) only the spring 57 is visible facing the graduated window 77.

Figure 32:
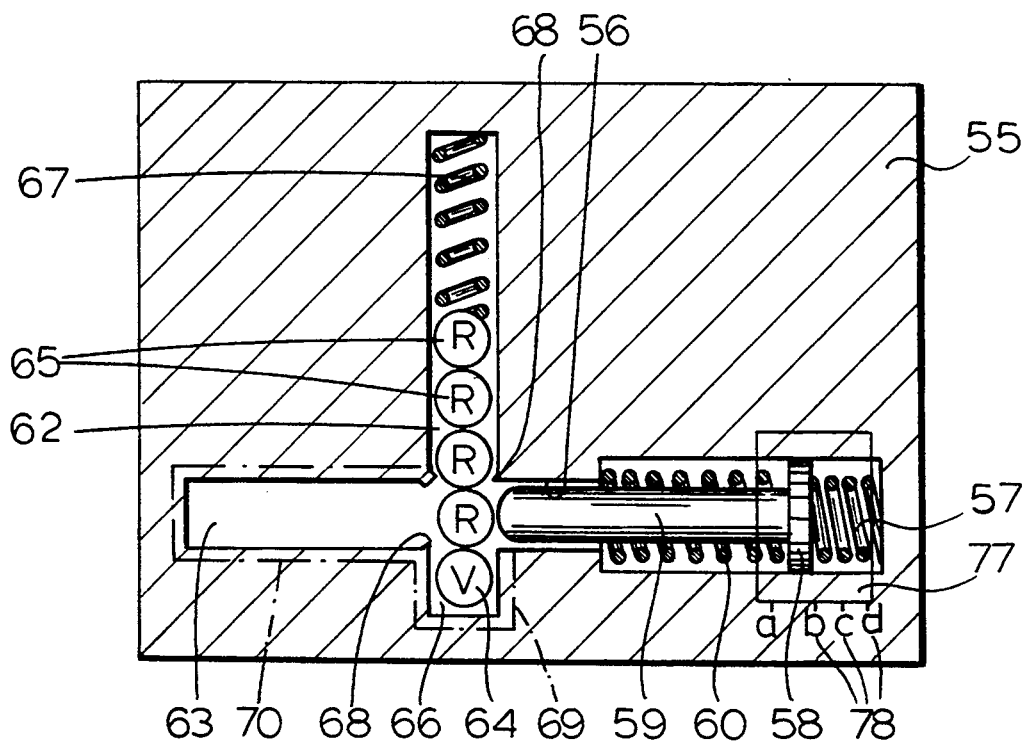

When the temperature falls to the set temperature, the device is in the position shown in FIG. 32, with the green ball 64 visible through a window 69 and the support of the piston 58 likewise being visible through the window 77, facing one of the graduations 78$b$.

These linear graduations correspond to a series of temperatures for a given spring 57 of memory alloy.

Thus, for example, in this case
a = −13° C.
b = −16° C.
c = −19° C.
d = −22° C.

In FIG. 32 the temperature is −16° C. It is thus possible for the exact value of the temperate to be continuously known when the device is at storage temperature.

Figure 33:
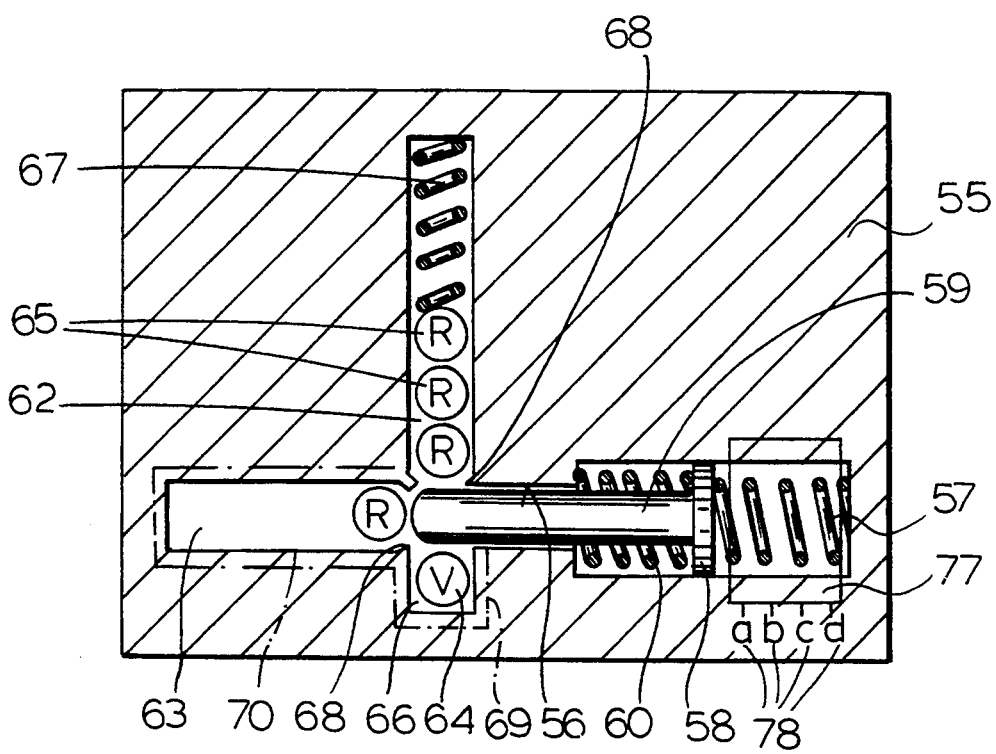

When the temperature rises above the set temperature, as is illustrated in FIG. 33, a red ball 65 is ejected into the compartment 63, where it is viewed through the window 70. The support of the piston 58, however, is no longer visible in the window 77.

Figure 34:
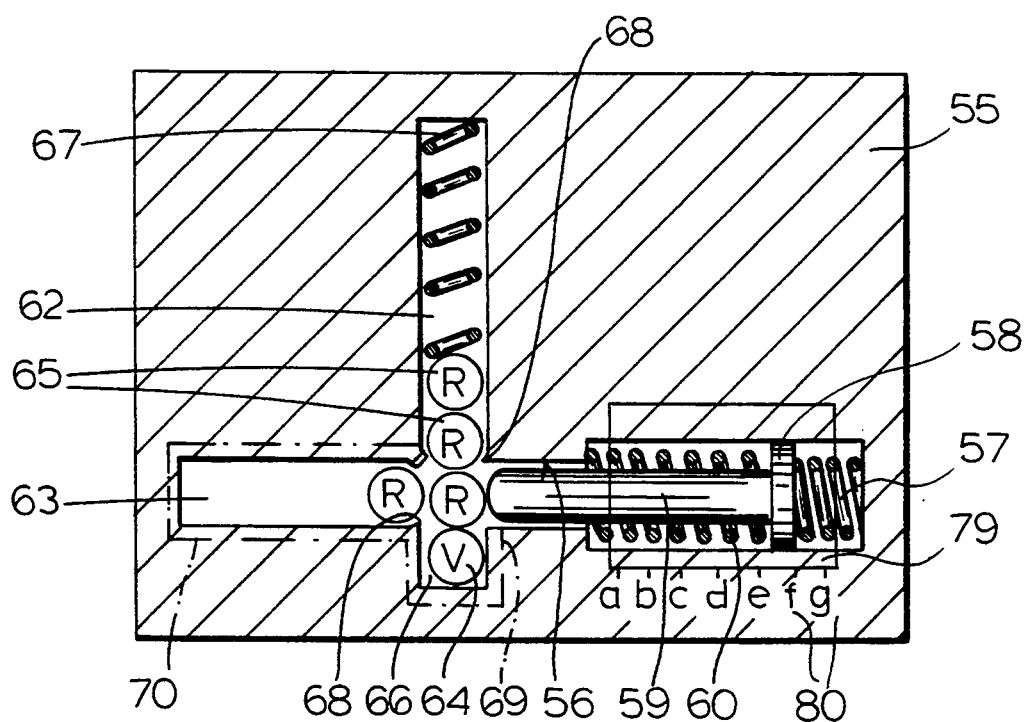

An advantageous variant of this device, illustrated in FIG. 34, consists in sufficiently enlarging the width of this graduated window 79 to determine instantaneously what the temperature is between for example:
a = +5° C.
b = 0° C.
c = −5° C.
d = −10° C.
e = −15° C.
f = −20° C.
g = −25° C.

Figure 35:
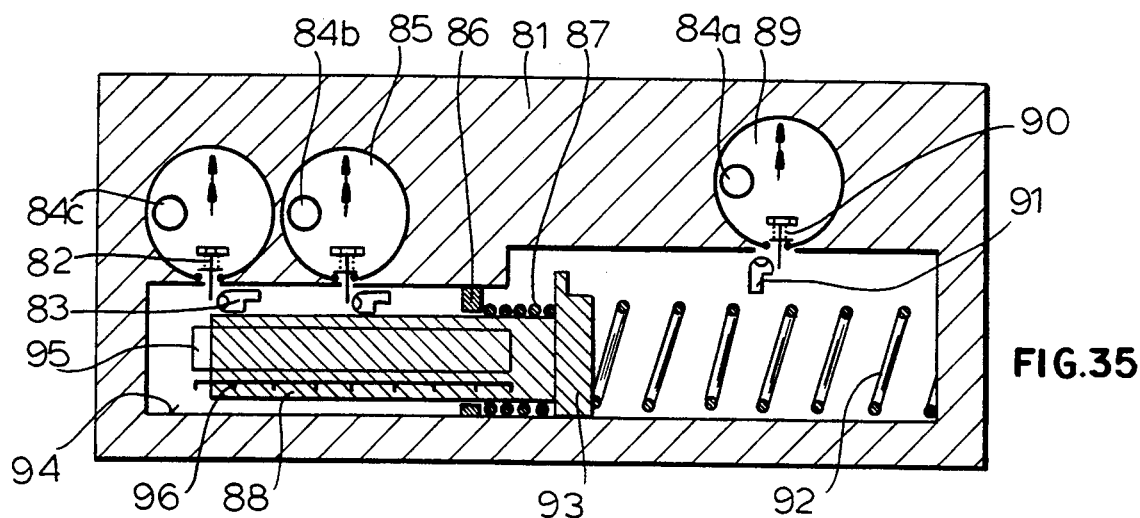
FIGS. 35 to 37 show three views in section of a device enabling the durations of the overstepping of the various predetermined temperature thresholds to be indicated.
Figure 36:
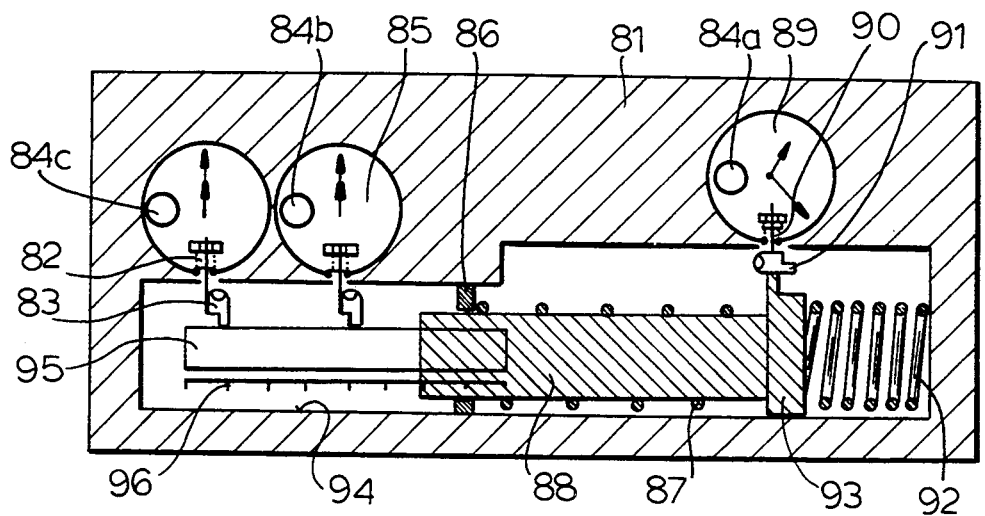
Figure 37:
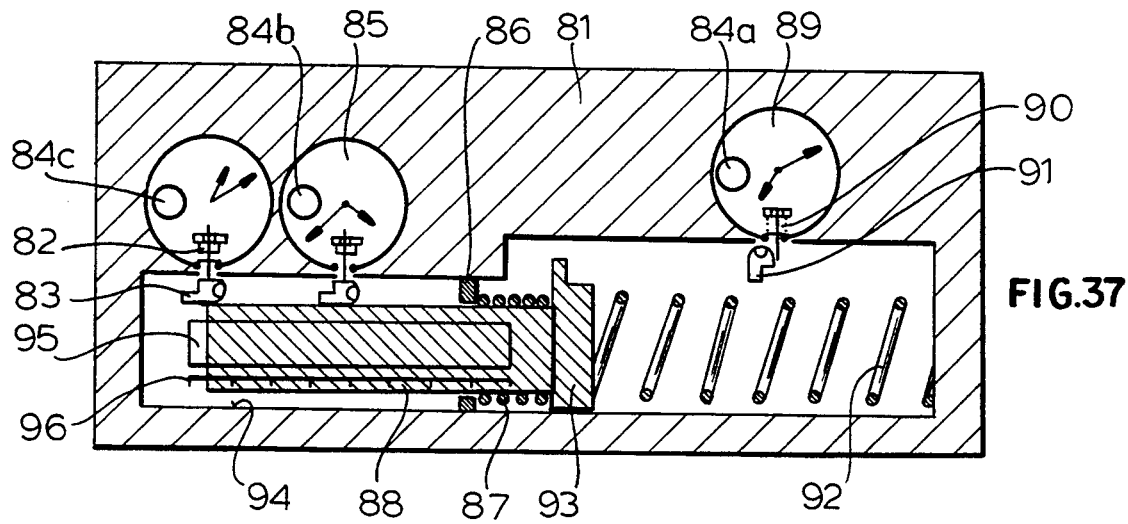

FIGS. 35 to 37 show three views in section of another device making it possible to indicate the durations of the overstepping of the different predetermined temperature thresholds.

This device comprises a casing 81 of parallelepipedic general shape, in which an elongate chamber 94 is provided. At one end this chamber contains a spring 92 of an alloy which memorizes its shape, of which spring one end is fastened to the bottom of the chamber while the other end is supported against the head of a piston 93 fastened to a rod 88. A balancing spring 87, the presence of which is optional, bears against said piston 93. The chamber 94 has a second part, separated from the other part by a baffle 86. In each part of this chamber 94 is situated at least one clockwork mechanism 85, 89 coupled to a revolution-counter mechanism 84, the triggering of which is effected with the aid of specific pushers 83, 91 operating a switch 82, 90.

At ambient temperature the device is in the state illustrated in FIG. 5, with the spring 92 which memorizes its shape relaxed and the piston and its rod 93 occupying the entire left-hand end of the elongate chamber 94. The balancing spring 87 is compressed between the baffle 86 and the support of the piston 93.

Because of the absence of the support of the piston 93 under the pusher 91, the switch 90 is not operated and the clockwork movement 89 for the set (storage) temperature indicates a zero duration and the number of passages to this storage temperature is also zero on the revolution counter $84_a$.

Despite the presence of the piston rod, the end of which in the graduated window 95, 96 indicates ambient temperature (for example 20° C.), under the pushers 83 of the clockwork mechanisms for the overstepping of high temperatures, the clockwork movements 85 indicate a zero duration and also the number of passages, which is zero for each of the revolution counters $84_b$ and $84_c$.

This is explained by the shape of the pushers 83, which are mounted inversely to the one shown at 91. Thus during the assembly of the device at ambient temperature at the factory, although the piston rod is in contact with the pushers, the latter cannot trigger the clockwork mechanisms and the revolution counters.

The device is therefore new and armed and no clockwork mechanism is operating.

When the temperature falls to the set temperature the memory spring 92 contracts, allowing the piston to move back. The support of the piston 93 pivots the pusher 91, which triggers the switch 90. The clockwork mechanism for low temperature (for example −18° C.) starts to operate, and the revolution counter $84_a$ does the same, indicating 1.

FIG. 36 indicates this functioning. The end of the piston is situated in the window 95 at a right-hand end, where the graduation 96 indicates −20° C., or else a lower temperate such as −25° C.

Thus, by looking at the device it is known that:
it has for a period of x hours been at at least −20° C., this is its first passage, and at the moment of time t it is at −25° C. for example.

With regard to the clockwork movements 85 corresponding to the oversteppings of the high temperatures, they still indicate a zero duration and also the number of passages, which is zero for each of the revolution counters $84_b$, $84_c$. This is due to the absence of the piston rod under each of the pushers 83, which cannot operate the switches 82.

In the storage position only the clockwork mechanism for the storage temperature functions, and its revolution counter indicates 1.

When the temperature rises above the set temperature, as shown in FIG. 37, the memory spring 92 relaxes and moves the piston forwards, and, depending on its amplitude, this movement:

stops the storage temperature clockwork mechanism because of the absence of the piston head under the pusher 91,
triggers at least one of the clockwork mechanisms for high temperatures because of the presence of the piston rod under the pusher 83, which operates the switch 82, the time starts to be indicated and the revolution counter marks 1 ($84_b$).

If the amplitude of the movement is greater (the temperature is higher), the piston rod operates the second pusher 83, the second clockwork mechanism starts to operate and the revolution counter $84_c$ marks 1.

The temperature of the device can be continuously read through the position of the left-hand end of the piston rod facing the graduation 96 of the window 95.

When the temperature falls back to the set temperature, the memory spring contracts and the support of the piston 93 once again pivots the pusher 91, which triggers the switch 90. The clockwork mechanism for low temperature starts to run again, and the revolution counter $84_a$ indicates 2.

When there is another rise in temperature, it will be the clockwork mechanism or mechanisms for high temperatures that start to run again, as well as the revolution counter or counters which indicate 2.

The clockwork mechanisms may be mechanical (at all temperatures from −150° C. to +130° C.), or electronic (at temperatures between −30° C and +60° C.).

The correct functioning of a system of this kind can be monitored at any time, since in fact:

the number of oversteppings for each high-temperature mechanism must always be at least one less than for the storage temperature mechanism, for example:
number of revolutions at −18° C.=x
number of revolutions at −5° C.=x−1
the number of oversteppings for high-temperature mechanisms must obey the following rule:
number of revolutions at −5° C.=x; the number of revolutions at 0° C. (which is farther to the left in the device shown in FIG. 37) is then lower than or equal to x. The mechanism must in fact always trigger at −5° C. before triggering at 0° C., if it goes as far as that temperature. In addition, the duration of the overstepping at 0° C. will always be shorter than or equal to the duration of the overstepping of −5° C.

Thus, by looking at the clockwork mechanisms and the associated revolution counters it is possible to check, through these conditions, whether there is a fault in the marking system (pusher damaged. . . . ).

Instead of a clockwork mechanism for storage temperatures and high temperatures, it is possible to make use of an electronic system recording, when the pusher is operated, all the data and overstepping dates. The last-mentioned device is the most sophisticated.

Finally, it is possible to have a system of the kind described in FIG. 35, which by the addition of an electronic calendar indicates the dates when high temperatures are overstepped.

A variant of this system may consist of two windows 95 which have graduations 96 and are smaller in size, situated at each end of the chamber 94, facing the clockwork mechanisms.

By using a piston 93 whose support is green in color and whose rod is red in color, it would be known at any moment by looking at the window at the right-hand end:

if the color is greens: all is well and the clockwork mechanism is consulted, and by looking at the window at the left-hand end:
if the color is red: warning: the temperature has been overstepped and the clockwork mechanism should be consulted to ascertain the durations of the oversteppings of the temperature.

Figure 38:
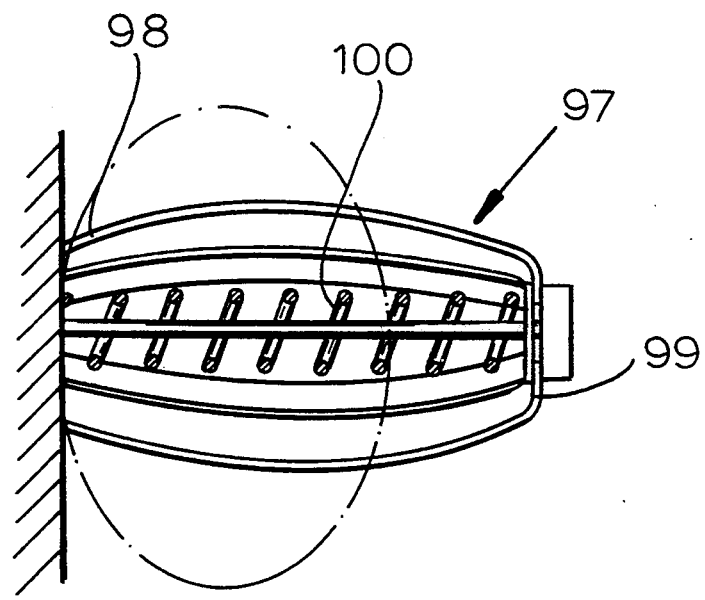
FIG. 38 shows a rotary actuator which memorizes its shape.

FIG. 38 illustrates a rotary actuator which makes it possible to obtain at the same time a longitudinal displacement of the spring type and a rotary movement without having recourse to a complex rotary device. This actuator has a structure in the general form of a sphere delimited by elements 97 of an alloy which memorizes its shape and made from wires, strips or flat springs. At its end 98 the sphere is fastened to the frame, while its other end 99 is free. A central spring 100 is associated with the sphere and has sufficient strength to flatten the latter in the martensitic phase, but too weak to retain it in the austenitic phase.

When cooled, the elements tend to retract by twisting, so that the fixed and movable ends are brought closer together, with a rotary movement of the movable end, which may be as great as 360°. When the temperature rises, the elements resume their previous position, bringing about an axial and rotational displacement in the opposite direction. This device is adapted to operate a warning system or to drive rotationally a system composed solely of free wheels, without using a rack and pinion pair.

The central spring 100 is not obligatory if the elements of an alloy which memorizes its shape are educated in two directions, for high and low temperature. The information transmission means may be similar to those described for the preceding embodiments. The use of a plurality of elements of an alloy which memorizes its shape makes it possible to obtain a very high-performance system.

In all the embodiments described above it is possible to use shape memorizing elements which operate with or without hysteresis.

In all the embodiments described above it is possible for one or more springs permitting modification of the reaction temperatures of the device to be associated with the element or elements of a memory alloy.

As is clear from the foregoing, the invention provides a great improvement of the existing technique by supplying a device for monitoring the temperature of a product or an article and detecting the overstepping of the temperature, with immediate visual indication of an overstepping and counting of the number of oversteppings.

As is obvious, the invention is not limited solely to the embodiments of this device which are described above as examples; on the contrary, it includes all constructional variants.

Thus, in particular, the means enabling thermal inertia to be introduced into the functioning of the spring could be different, and could for example consist of a cylinder inside which the spring would be installed, without thereby departing from the scope of the invention.

I claim:

1. A temperature monitoring device, comprising:
   an elongated casing formed with at least one window;
   a row of cogs formed in said casing and shaped to enable unidirectional travel therealong;
   a cursor in said casing shaped to be retained by said cogs and adapted to be stepped therealong in a direction of uni-directional travel;
   a spring composed at least in part of a shape-memory alloy and formed with one end bearing against said casing and with an opposite end, said spring being initially deformed upon exposure to a predetermined temperature level; and
   a rod fastened at said opposite end and longitudinally shiftable in said casing upon deforming said spring and formed with other cogs engageable with said cursor for stepping said cursor along said rod and said row upon exposure of said spring to another temperature, whereby a position of said cursor along said row can be viewed through said window, said cogs on said rod being spaced by a distance corresponding substantially to a stroke of said spring between said predetermined temperature and said other temperature.

2. The temperature monitoring device defined in claim 1 wherein said rod is formed at an end connected with said spring with a piston, said piston being connected with said spring, said rod being formed with a shoulder and carrying a ring adjacent said shoulder whereby said shoulder displaces said ring in a direction toward said spring upon an initial retraction of said spring to bring said ring into view through a window of said casing.

3. The temperature monitoring device defined in claim 1 wherein said cogs are shaped with surfaces inclined to said direction and surfaces perpendicular to said direction, said spring being braced between and secured to two cursors engageable by said cogs whereby said cursors are stepped along said row upon alternating contraction and expansion of said spring.

4. The temperature monitoring device defined in claim 1, further comprising means on said casing delaying deformation of said shape-memory alloy in response to a variation of temperature.

5. The temperature monitoring device defined in claim 4 wherein said means delaying deformation includes a ring on the casing.

6. The temperature monitoring device defined in claim 1 wherein said casing has a wall of a thickness delaying deformation of said shape-memory alloy in response to a variation of temperature.

7. A temperature monitoring device, comprising:
   an elongated casing formed with at least one window;
   a row of cogs formed in said casing and shaped to enable unidirectional travel therealong;
   a first cursor in said casing shaped to be retained by said cogs and adapted to be stepped therealong in a direction of unidirectional travel;
   a second cursor spaced from said first cursor along said direction and engageable by said cogs, said cogs being shaped with surfaces inclined to said direction and surfaces perpendicular to said direction;
   a spring composed at least in part of a shape-memory alloy and braced between and secured to said first and second cursors, said spring being initially deformed upon exposure thereof to a predetermined temperature level and effective, upon exposure to another temperature, to step said cursors along said row upon alternating contraction and expansion of said spring, whereby a position of said first cursor along said row can be viewed through said window.

8. The temperature monitoring device defined in claim 7 wherein said shape-memory alloy possesses hysteresis, a rearwardly one of said cursors with respect to said direction having a rod extending movably through a forwardly one of said cursors, said rod having an end projecting beyond said forwardly cursor and formed with a shoulder, a compensation spring being braced between said shoulder and said forwardly cursor.

9. The temperature monitoring device defined in claim 7 wherein one of said cursors is composed of a shape-memory alloy.

10. The temperature monitoring device defined in claim 7 wherein a rearwardly one of said cursors with respect to said direction has a rod extending movably through a forwardly one of said cursors, said rod having an end projecting beyond said forwardly cursor and formed with a shoulder.

* * * * *